US011341785B2

(12) United States Patent
Lowenthal et al.

(10) Patent No.: US 11,341,785 B2
(45) Date of Patent: *May 24, 2022

(54) SYSTEM AND METHOD FOR MANAGING ELECTRIC VEHICLES

(71) Applicant: ChargePoint, Inc., Campbell, CA (US)

(72) Inventors: Richard Lowenthal, Cupertino, CA (US); Milton Tormey, Los Altos, CA (US); James Solomon, Saratoga, CA (US)

(73) Assignee: CHARGEPOINT, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/074,453

(22) Filed: Oct. 19, 2020

(65) Prior Publication Data

US 2021/0142589 A1    May 13, 2021

Related U.S. Application Data

(63) Continuation of application No. 14/596,125, filed on Jan. 13, 2015, now Pat. No. 10,810,804, which is a
(Continued)

(51) Int. Cl.
*B60L 53/14* (2019.01)
*B60L 53/68* (2019.01)
(Continued)

(52) U.S. Cl.
CPC .............. *G07C 5/008* (2013.01); *B60L 53/14* (2019.02); *B60L 53/30* (2019.02); *B60L 53/305* (2019.02);
(Continued)

(58) Field of Classification Search
CPC ......... G07C 5/008; B60L 58/12; B60L 53/30; B60L 53/68; B60L 53/665; B60L 53/14;
(Continued)

(56) References Cited

U.S. PATENT DOCUMENTS 5,803,215 A    9/1998 Henze et al.
6,625,539 B1   9/2003 Kittell et al.
(Continued)

FOREIGN PATENT DOCUMENTS

EP    1394921 A2    3/2004
JP    2001-078304 A  3/2001
(Continued)

OTHER PUBLICATIONS

Communication pursuant to Article 94(3) EPC, EP App. No. 10744272.5, dated Jul. 29, 2020, 4 pages.
(Continued)

*Primary Examiner* — Mohamed Charioui
(74) *Attorney, Agent, or Firm* — Nicholson De Vos Webster & Elliott LLP

(57) ABSTRACT

A system and method for managing a plurality of electric vehicles with a fleet management portal is described herein. In one embodiment, a machine implemented method for managing one or more fleets of electric vehicles includes monitoring one or more fleets of electric vehicles using a fleet management portal associated with a server. Next, the method includes monitoring a plurality of charge transfer devices using the fleet management portal. Next, the method includes receiving charging information from the charge transfer devices. Next, the method includes determining a charging status for each electric vehicle based on the charging information. Next, the method includes generating one or more reports having the charging status for each electric vehicle.

18 Claims, 23 Drawing Sheets

Related U.S. Application Data continuation of application No. 12/372,721, filed on Feb. 17, 2009, now Pat. No. 8,935,112.

(51) Int. Cl.
| | | |
|---|---|---|
| *B60L 53/30* | (2019.01) | |
| *B60L 58/12* | (2019.01) | |
| *G07C 5/00* | (2006.01) | |
| *B60L 53/66* | (2019.01) | |

(52) U.S. Cl.
CPC ............ *B60L 53/665* (2019.02); *B60L 53/68* (2019.02); *B60L 58/12* (2019.02); *Y02T 10/70* (2013.01); *Y02T 10/7072* (2013.01); *Y02T 90/12* (2013.01); *Y02T 90/14* (2013.01); *Y02T 90/167* (2013.01); *Y04S 30/12* (2013.01)

(58) Field of Classification Search
CPC ........ B60L 53/305; Y02T 10/70; Y02T 90/12; Y02T 90/167; Y02T 10/7072; Y02T 90/14; Y02T 90/168; Y02T 90/16; Y04S 30/12
See application file for complete search history.

(56) References Cited

U.S. PATENT DOCUMENTS

| | | | |
|---|---|---|---|
| 6,850,898 | B1 * | 2/2005 | Murakami ............ B60L 53/305 705/13 |
| 7,181,409 | B1 | 2/2007 | Murakami et al. |
| 2004/0024502 | A1 | 2/2004 | Squires et al. |
| 2004/0073440 | A1 | 4/2004 | Garbers et al. |
| 2007/0271015 | A1 | 11/2007 | Bauer et al. |
| 2007/0294033 | A1 | 12/2007 | Osentoski et al. |
| 2008/0281732 | A1 | 11/2008 | Yamada |
| 2009/0027056 | A1 | 1/2009 | Huang et al. |
| 2009/0091291 | A1 * | 4/2009 | Woody ................. B60W 10/08 320/109 |
| 2009/0174365 | A1 | 7/2009 | Lowenthal et al. |
| 2010/0152960 | A1 | 6/2010 | Huber et al. |
| 2010/0174667 | A1 * | 7/2010 | Vitale .................... B60L 53/62 705/412 |

FOREIGN PATENT DOCUMENTS

| | | |
|---|---|---|
| JP | 2005-198445 A | 7/2005 |
| JP | 2006-074868 A | 3/2006 |
| JP | 2008-065635 A | 3/2008 |
| WO | 03/91856 A2 | 11/2003 |

OTHER PUBLICATIONS

Extended European Search Report, EP App. No. 10744272.5, dated Oct. 6, 2017, 11 pages.
Final Office Action, U.S. Appl. No. 12/372,721, dated Nov. 30, 2012, 12 pages.
Final Office Action, U.S. Appl. No. 12/372,721, dated Sep. 13, 2011, 12 pages.
First Examination Report, AU App. No. 2010216053, dated Aug. 6, 2014, 2 pages.
First Office Action, JP App. No 2011-551199, dated Apr. 3, 2014, 13 pages (7 pages of English Translation and 6 pages of Original Document).
International Preliminary Report on Patentability, PCT/US2010/024500, dated Sep. 1, 2011, 7 pages.
International Search Report and Written Opinion, PCT/US2010/024500, dated Apr. 14, 2010, 08 pages.
Non-Final Office Action, U.S. Appl. No. 12/372,721, dated Jul. 19, 2013, 11 pages.
Non-Final Office Action, U.S. Appl. No. 12/372,721, dated Jul. 6, 2012, 13 pages.
Non-Final Office Action, U.S. Appl. No. 14/596,125, dated Oct. 7, 2019, 16 pages.
Non-Final Office Action, U.S. Appl. No. 12/372,721, dated Jan. 19, 2011, 15 pages.
Notice of Allowance, U.S. Appl. No. 12/372,721, dated Apr. 16, 2014, 9 pages.
Notice of Allowance, U.S. Appl. No. 12/372,721, dated Aug. 4, 2014, 10 pages.
Notice of Allowance, U.S. Appl. No. 14/596,125, dated Jun. 22, 2020, 10 pages.

* cited by examiner

Fleet Management Portal

Welcome: Fleet Manager / Logout

| Home | Status | Check Out/In | Reports | Manage | Help |
|---|---|---|---|---|---|

700

Check Out  710
Check In (Return)

Check-Out Vehicle:

1. Driver: [Eric ▶]  — Filter Drive List: ☐ Dept [<select> ▶]  ☑ Name [Eric]  [Filter] [Reset]

2. Vehicle: [xxxxxx1 ▶] — Filter Vehicle List: ☐ Fleet [<select> ▶]  ☑ Type [Prius ▶]  [Filter] [Reset]

3. Duration: [05:00:00] (hh:mm:ss)  Shortcuts: 1hr  2hrs  5hrs  8hrs

4. Notifications:
   ☑ Vehicle Not Returned.        (Notify: ◉ Both, ○ Driver, ○ Fleet Manager)
   ☑ Vehicle Not Plugged In.      (Notify: ◉ Both, ○ Driver, ○ Fleet Manager)
   ☑ Vehicle Fully Charged.       (Notify: ○ Both, ○ Driver, ◉ Fleet Manager)

[Check-Out]   [Cancel]

FIG. 7

Fleet Management Portal  Welcome: Fleet Manager / Logout

| Home | Status | Check Out/In | Reports | Manage | Help |

Check Out
Check In (Return) ← 892

↑ 890

Check-In (Return) Vehicle:

Filter Driver/Vehicle Pick List:
☐ Dept    <select> ▶    ☐ Name    [          ]
☐ Fleet   <select> ▶    ☑ Type    Toyota Prius ▶

Filter    Reset

Driver / Vehicle:    Eric    /xxxxx1 (Blue Prius) ▶

Check-In    Cancel

FIG. 8

Fleet Management Portal

| Home | Status | Check Out/In | Reports | Manage | Help |
|---|---|---|---|---|---|
| | | | Sessions | | |
| | | | Check Out/In | | |

Welcome: Fleet Manager / Logout

1000

1010

Filter Check Out/Check-In List:

☐ Driver `<select>` ▶  ☑ Dept  SF Fire ▶

☐ Vehicle `<select>` ▶  ☐ Fleet `<select>` ▶

☐ Start

☐ End  ☐ Type `<select>` ▶

Shortcuts: this week / this month / this year

[Filter] [Reset]

Total (as filtered): Duration = 10d, 14h 23m 59s

1020

Export CSV

| Fleet | Vehicle | Dept | Driver | Check-Out^ | Check-In | Duration |
|---|---|---|---|---|---|---|
| SF Fire Airport | xxxxx1 | SF Fire | Paul | 2009-01-12 08:52:00 | 2009-01-12 14:44:44 | 05:52:44 |
| SF Fire Airport | xxxxx2 | SF Fire | George | 2009-01-13 09:08:00 | 2009-01-13 16:11:22 | 07:03:22 |
| SF Fire Airport | xxxxx3 | SF Fire | Ringo | 2009-01-15 15:00:00 | 2009-01-15 19:05:09 | 04:05:09 |
| SF Fire Airport | xxxxx4 | SF Fire | John | 2009-01-23 10:00:00 | (out) | 02:03:27 |

1030

First Prev 1 2 3 ... 9 Next Last

FIG. 10

Fleet Management Portal          Welcome: Fleet Manager / Logout

| Home | Status | Check Out/In | Reports | Manage | Help |
|---|---|---|---|---|---|

1100 →

1110 — Manage dropdown:
- Fleet
- Vehicle
- Department
- Driver
- Vehicle Template
- Admin

Filter Fleet List:

☐ Name [ _____ ]  ☑ Vehicles [ >4 ]

☐ Description [ _____ ]

[ Filter ]  [ Reset ]

Add New....   View Details....   Edit ....   Delete ....                                      Export CSV

| Edit | Name ^ | Description | Contact | Contact | Vehicles |
|---|---|---|---|---|---|
| ⦿ | SF Fire Airport | Airport Division | Chief | +1-415-555-5555 | 10 |
| ○ | SF Fire Support | Support Service | Marge | +1-415-555-5555 | 10 |
| ○ | SF Fire Training | Division of Training | Bart | +1-415-555-5555 | 15 |
| ○ | SF Police Admin | Bureau of Administration | Lisa | +1-415-555-5555 | 12 |
| ○ | SF Police Airport | Airport Bureau | Homer | +1-415-555-5555 | 7 |

1130

First Prev 1 2 3 ... 9 Next Last

| Add New... | View Details ... | Edit ... | Delete ... | | Export CSV |
|---|---|---|---|---|---|

| Edit | Name ^ | Description | Contact | Contact | Vehicles |
|---|---|---|---|---|---|
| ⦿ | SF Fire Airport | Airport Division | Chief | + 1-415-555-5555 | 10 |

Edit Fleet

| Fleet Name | SF Fire Airport | | Contact Name | Chief |
|---|---|---|---|---|

| Description | Airport Division | | Phone | +1-415-555-5555 |
|---|---|---|---|---|

Vehicles

Remove Selected ...       Add...                          Export CSV

| Remove | License ^ | Color | Type | Year |
|---|---|---|---|---|
| ⌦ | xxxxx1 | Red | Toyota Prius (Hymotion) | 2008 |
| ⌦ | xxxxx2 | White | Toyota Prius (Hymotion) | 2009 |
| ⌦ | xxxxx3 | Blue | Chevy Volt | 2010 |
| ⌦ | xxxxx4 | Orange | Mitsubishi MiEV | 2011 |

1330

Add Vehicles:

Filter Vehicle List:

☑ License [yyyy]   ☐ RFID [   ]   ☐ Color [   ]
☐ Status [<select> ▼]    ☐ Template [<select> ▼]

[Filter]  [Reset]

| Add | License ^ | Color | Type | Year |
|---|---|---|---|---|
| ☐ | xxxxx1 | Red | Toyota Prius (Hymotion) | 2008 |
| ☐ | xxxxx2 | White | Toyota Prius (Hymotion) | 2009 |
| ☐ | xxxxx3 | Blue | Chevy Volt | 2010 |
| ☐ | xxxxx4 | Orange | Mitsubishi MiEV | 2011 |

[Add Selected]  [Cancel]

[Update]  [Cancel]

FIG. 13

Fleet Management Portal

FIG. 14

Fleet Management Portal

Welcome: Fleet Manager / Logout

| Home | Status | Check Out/In | Reports | Manage | Help |

Manage menu (1410):
- Fleet
- Vehicle
- Department
- Driver
- Vehicle Template
- Admin

1500

Filter Vehicle List:

- ☑ License: xxxxx    ☐ Vehicles    ☐ Color
- ☐ Status: <select>    ☐ Template    <select>    (add year)

[Filter] [Reset]

Add New...  View Details...  Edit...  Delete...  Import CSV  Export CSV

| Select | License | RFID | Template Name | Color | Year | Status |
|---|---|---|---|---|---|---|
| ○ | xxxxx1 | 5555555 | Toyota Prius (Hymotion) | Teal | 2007 | Wayne |
| ⦿ | xxxxx2 | 6666666 | Chevy Volt | Gray | 2010 | City Hall 001 |

Edit Vehicle: (1530)

- License: xxxxx2
- RFID: 666666
- Color: Gray
- Year: 2010
- Template: Chevy Volt ▼
- Fleet: SF Fire ▼

[Update] [Cancel]

| ○ | xxxxx3 | 7777777 | Telsa Roadster | Red | 2008 | City Hall 002 |
| ○ | xxxxx4 | 8888888 | BMW Mini-E | Blue | 2009 | City Hall 003 |

FIG. 15

Fleet Management Portal — Welcome: Fleet Manager / Logout

| Home | Status | Check Out/In | Reports | Manage | Help |
|---|---|---|---|---|---|

Manage menu (1610):
- Fleet
- Department
- Driver
- Vehicle Template
- Admin

1600

Filter Department List:
- ☐ Name  [SF FIre]
- ☑ Drivers  [>=5]
- ☐ Description  [ ]

[Filter] [Reset]

Add New... | View Details... | Edit... | Delete... | Export CSV

| Select | Dept. ^ | Description | Contact Person | Phone | Drivers |
|---|---|---|---|---|---|
| ○ | SF Fire | Fire Department | John | +1-415-555-5555 | 54 |
| ⦿ | SF Police | Police Department | Dagny | +1-415-555-5555 | 234 |
| ○ | SF Sanitation | Sanitation Department | Hank | +1-415-555-5555 | 92 |
| ○ | SF Public Works | Public Works Department | Ragnar | +1-415-555-5555 | 32 |
| ○ | SF Utilities | Utilities Department | Cherryl | +1-415-555-5555 | 12 |

1630

First Prev 1 2 3 ... 9 Next Last

Fleet Management Portal — Welcome: Fleet Manager / Logout

| Home | Status | Check Out/In | Reports | Manage | Help |

Manage menu (1710):
- Fleet
- Vehicle
- Department
- Driver
- Vehicle Template
- Admin

1700

Filter Department List:
- ☐ Name | SF Fire
- ☐ Description
- ☒ Drivers

[Filter] [Reset]

Add New....  View Details....  Edit....  Delete....  Export CSV

| Select | Dept.^ | Description | Contact Person | Phone | Drivers |
|---|---|---|---|---|---|
| ○ | SF Fire | Fire Department | John | +1-415-555-5555 | 54 |
| ⦿ | SF Police | Police Department | Dagny | +1-415-555-5555 | 234 |

Edit Department: (1730)

| Dept Name | SF Police | Contact | Dagny |
|---|---|---|---|
| Description | Police Department | Phone | +1-415-555-5555 |

Drivers  Add
Remove Selected....  Export CSV

| Select | Dept | Driver^ | Phone | Status |
|---|---|---|---|---|
| ☐ | SF Police | Guy | +1-415-555-5555 | - |
| ☐ | SF Police | Ken | +1-415-555-5555 | - |
| ☐ | SF Police | Maurice | +1-415-555-5555 | - |
| ☐ | SF Police | Pete | +1-415-555-5555 | - |
| ☐ | SF Police | Yvan | +1-415-555-5555 | - |

[Update] [Cancel]

Fleet Management Portal  Welcome: Fleet Manager / Logout

| Home | Status | Check Out/In | Reports | Manage | Help |
|---|---|---|---|---|---|

1800

Manage:
- Fleet
- Vehicle
- Department
- Driver — 1810
- Vehicle Template
- Admin

Filter Department List:

☐ Name [      ]   ☐ ID [      ]   ☐ Phone [      ]

☒ Dept [SF Fire ▼]   ☐ Status [<select> ▼]

[Filter]   [Reset]

Add New...   View Details   Edit...   Delete...   Import CSV   Export CSV

| Select | Dept.^ | Driver | Phone | Status |
|---|---|---|---|---|
| ○ | SF Fire | Wayne | +1-415-555-5555 | yyyyy5 |
| ◉ | SF Fire | Jari | +1-415-555-5555 | - |
| ○ | SF Fire | Mark | +1-415-555-5555 | yyyyy3 |
| ○ | SF Fire | Glenn | +1-415-555-5555 | - |
| ○ | SF Fire | Grant | +1-415-555-5555 | - |

1830

First Prev 1 2 3 ... 9 Next Last

FIG. 18

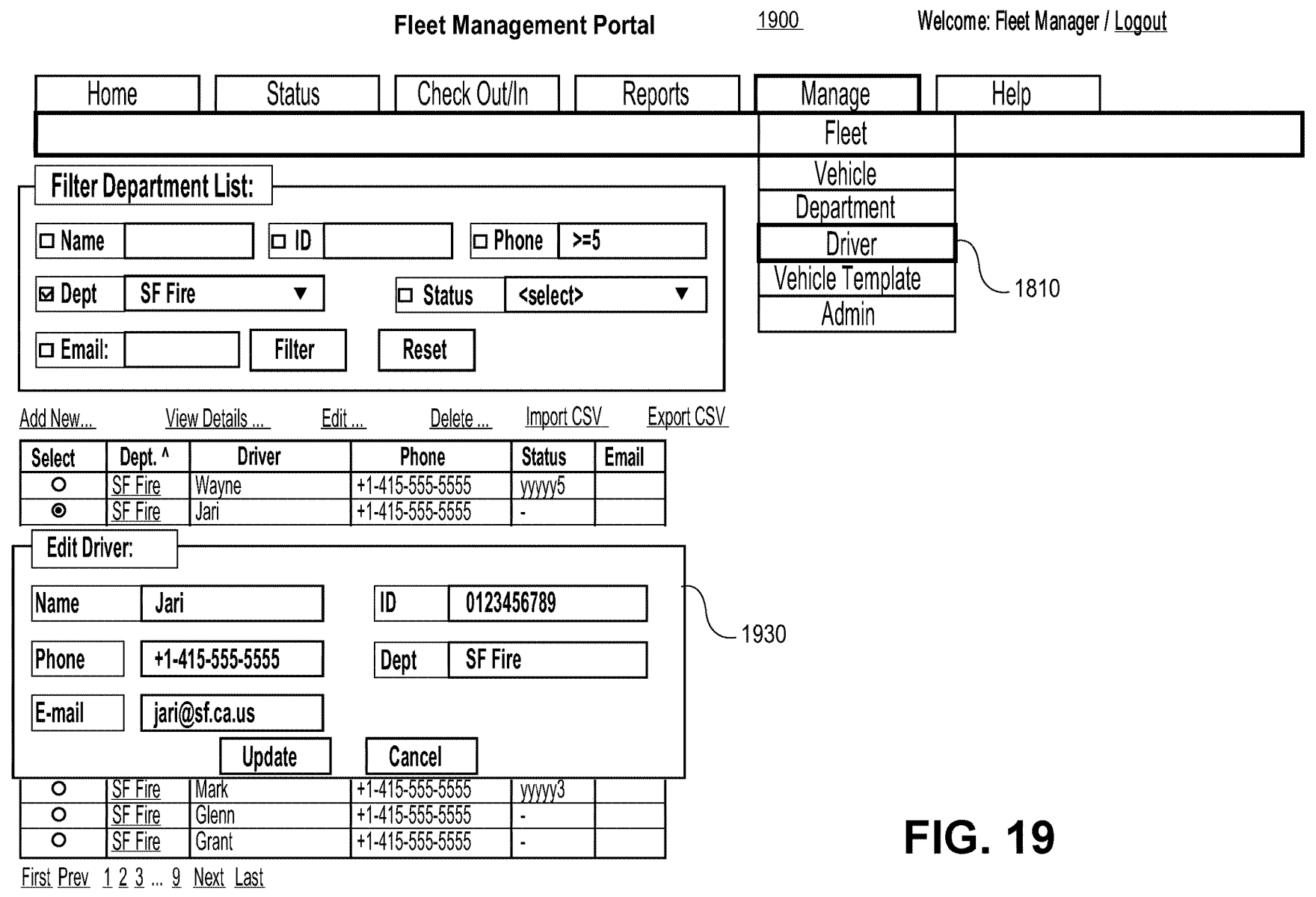

Fleet Management Portal    Welcome: Fleet Manager / Logout

| Home | Status | Check Out/In | Reports | Manage | Help |

Manage menu (1810):
- Fleet
- Vehicle
- Department
- Driver
- Vehicle Template
- Admin

1900

Filter Department List:
- ☐ Name  ☐ ID  ☐ Phone  >=5
- ☑ Dept  SF Fire  ☐ Status  <select> ▶
- ☐ Email:  [Filter]  [Reset]

Add New...    View Details...    Edit...    Delete...    Import CSV    Export CSV

| Select | Dept. ^ | Driver | Phone | Status | Email |
|---|---|---|---|---|---|
| ○ | SF Fire | Wayne | +1-415-555-5555 | yyyy5 | |
| ⦿ | SF Fire | Jari | +1-415-555-5555 | - | |

Edit Driver: (1930)

| Name | Jari | ID | 0123456789 |
|---|---|---|---|
| Phone | +1-415-555-5555 | Dept | SF Fire |
| E-mail | jari@sf.ca.us | | |
| [Update] | | [Cancel] | |

| ○ | SF Fire | Mark | +1-415-555-5555 | yyyy3 | |
| ○ | SF Fire | Glenn | +1-415-555-5555 | - | |
| ○ | SF Fire | Grant | +1-415-555-5555 | - | |

First Prev 1 2 3 ... 9 Next Last

FIG. 19

Fleet Management Portal — Welcome: Fleet Manager / Logout

| Home | Status | Check Out/In | Reports | Manage | Help |

2000

- Fleet
- Vehicle
- Department
- Driver
- Vehicle Template — 2010
- Admin

Filter Vehicle Template List:

☐ Name [      ]   ☐ Make [      ]   ☐ Model [      ]

☒ Battery  [>= 5.0]  (kWh)   ☐ Efficiency [      ] (mi/kWh)

☐ Email: [      ]   [Filter]  [Reset]

Add New...   View Details...   Edit...   Delete...   Export CSV

| Select | Template Name | Make | Model | Battery (kWh) | Efficiency (mi/kWh) |
|---|---|---|---|---|---|
| ○ | Toyota Prius (Hymotion) | Toyota | Prius (Hymotion) | 5.0 | 6.0 |
| ⦿ | Chevy Volt | Chevy | Volt | 8.0 | 5.0 |
| ○ | Tesla Roadster | Tesla | Roadster | 53.0 | 4.2 |
| ○ | BMW Mini-E | BMW | Mini-E | 35.0 | 4.3 |

2030

First Prev  1 2 3 ... 9  Next Last

FIG. 20

Fleet Management Portal

Welcome: Fleet Manager / Logout

| Home | Status | Check Out/In | Reports | Manage | Help |

2100

Manage:
- Fleet
  - Vehicle
  - Department
  - Driver
  - Vehicle Template — 2010
- Admin

Filter Vehicle Template List:

☐ Name _____    ☐ Make _____    ☐ Model _____

☑ Battery  >= 5.0 (kWh)    ☐ Efficiency _____ (mi/kWh)

☐ Email: _____    [Filter]    [Reset]

Add New...    View Details...    Edit...    Delete...    Export CSV

| Select | Template Name | Make | Model | Battery (kWh) | Efficiency (mi/kWh) |
|---|---|---|---|---|---|
| ○ | Toyota Prius (Hymotion) | Toyota | Prius (Hymotion) | 5.0 | 6.0 |
| ● | Chevy Volt | Chevy | Volt | 8.0 | 5.0 |

Edit Vehicle Template — 2130

Template Name: Chevy Volt

Make: Chevy

Model: Volt

Battery Size: 8.0 (kWh)

Efficiency: 5.0 (mi/kWh)

Charging Time: 5.0 (hours)

Notification Power Threshold (must be > "Charged"/Idle Power): 0.120 (kW)

[Update]  [Cancel]

| ○ | Tesla Roadster | Tesla | Roadster | 53.0 | 4.2 |
| ○ | BMW Mini-E | BMW | Mini-E | 35.0 | 4.3 |

First Prev 1 2 3 ... 9 Next Last

FIG. 21

SYSTEM AND METHOD FOR MANAGING ELECTRIC VEHICLES

CROSS-REFERENCE TO RELATED APPLICATIONS

This application is a continuation of application Ser. No. 14/596,125, filed Jan. 13, 2015, which is a continuation of application Ser. No. 12/372,721, filed Feb. 17, 2009, now U.S. Pat. No. 8,935,112, which is hereby incorporated by reference.

FIELD

This invention relates to the field of systems and methods for managing the charging of electric vehicles.

BACKGROUND

The electric car, electric vehicle (EV) and battery electric vehicle are all used to describe automobiles powered by one or more electric motors utilizing energy stored in rechargeable battery(ies) (or other electricity storage devices such as supercapacitors). The batteries are recharged by connecting to an electrical outlet. Efficient recharging of the batteries typically requires hours and is often done overnight or while the electric vehicle is parked for a significant time. The use of electric vehicles is limited by the sparse availability of recharging facilities. A grouping of electric vehicles may be associated with a particular charging station. These electric vehicles need to recharge during periods of non-use in order to be charged for and ready for periods of use. One or more drivers of the electric vehicles may forget to recharge an electric vehicle or improperly connect the electric vehicle during a period of non-use causing one or more electric vehicles to be unavailable for a subsequent period of use. Additionally, a limited number of charging stations having a limited number of charge transfer devices, which may cause scheduling difficulties for the efficient and timely recharging of the electric vehicles.

BRIEF DESCRIPTION OF THE DRAWINGS

The invention may best be understood by referring to the following description and accompanying drawings that are used to illustrate embodiments of the invention.

FIG. 7 illustrates an exemplary electric vehicle check out user interface of a software program for managing electric vehicles in accordance with one embodiment of the invention;

FIG. 8 illustrates an exemplary electric vehicle check in user interface of a software program for managing electric vehicles in accordance with one embodiment of the invention;

FIG. 10 illustrates an exemplary check out/in report user interface of a software program for managing electric vehicles in accordance with one embodiment of the invention;

FIGS. 11-13 illustrate exemplary fleet manage user interfaces of a software program for managing electric vehicles in accordance with one embodiment of the invention;

FIGS. 14 and 15 illustrate exemplary vehicle manage user interfaces of a software program for managing electric vehicles in accordance with one embodiment of the invention;

FIGS. 16 and 17 illustrate exemplary department manage user interfaces of a software program for managing electric vehicles in accordance with one embodiment of the invention;

FIGS. 18 and 19 illustrate exemplary driver manage user interfaces of a software program for managing electric vehicles in accordance with one embodiment of the invention;

FIGS. 20 and 21 illustrate exemplary vehicle template manage user interfaces of a software program for managing electric vehicles in accordance with one embodiment of the invention.

DETAILED DESCRIPTION

Figure 1A:
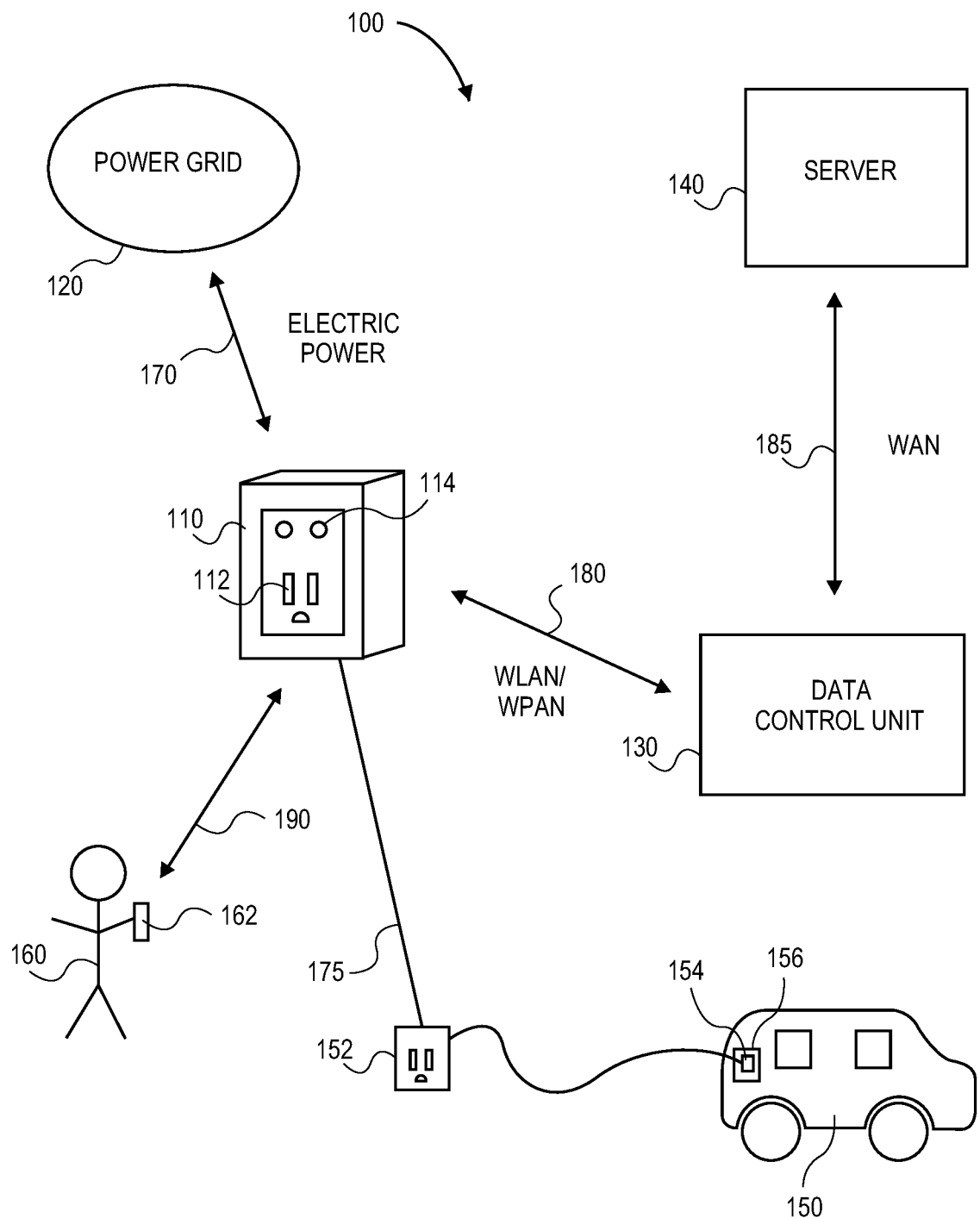
FIG. 1A is a schematic diagram of a network-connected charging outlet system according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements.

A system and method for managing one or more fleets of electric vehicles with a fleet management portal is described herein. In one embodiment, a machine implemented method for managing one or more fleets of electric vehicles includes monitoring one or more fleets of electric vehicles using a fleet management portal associated with a server. Next, the method includes monitoring a plurality of charge transfer devices using the fleet management portal. Next, the method includes receiving charging information from the charge transfer devices. Next, the method includes determining a charging status for each electric vehicle based on the charging information. Next, the method includes generating one or more reports having the charging status for each electric vehicle.

A first embodiment of the network-controlled charge transfer system 100 for charging electric vehicles is shown in FIG. 1A. The system 100 comprises a network-controlled charge transfer device 110, a local power grid 120, a data control unit 130, and a server 140. The system 100 interfaces with an electric vehicle 150, with an electrical connector 152, and an electric vehicle operator 160, via a mobile communication device 162. The network-controlled charge transfer device 110 is connected to the local power grid 120 by an electric power line 170, and to the electric vehicle 150 by the electrical connector 152 and charging cord 175. The flow of electrical power may be in either direction for both of these electrical connections. In other words, the electric vehicle 150 can be recharged from the local power grid 120, or the local power grid 120 can receive power from the electric vehicle 150. The charge transfer device 110 is coupled with the data control unit 130 over the WPAN (Wireless Personal Area Network) link 180 (e.g., Bluetooth, ZigBee, etc.) or WLAN (Wireless Local Area Network) (e.g., WiFi, etc.). The data control unit 130 is coupled with the server 140 over the WAN (Wide Access Network) connection 185 (e.g., Cellular (CDMA, GPRS, etc.), WiFi Internet connection, Plain Old Telephone Service modem, leased line, etc.). The electric vehicle operator 160 uses the mobile communication device 162 to establish a communication link to the charge transfer device 110 over a wireless network 190. According to one embodiment of the invention, the communication device 162 is a radio-frequency identification (RFID) device, which the operator 160 presents to establish a charging session for the electric vehicle 150. The RFID device includes unique operator-specific information (e.g., operator identification information, etc.). The communication link between the electric vehicle operator 160 and the charge transfer device 110 allows information to be shared which enables recharging of the electric vehicle 150.

The charge transfer device 110 comprises an electrical receptacle 112 and indicator lights 114. The electrical receptor 112 and the electrical connector 152 are configured to make an electrical connection allowing safe flow of electrical power between the charge transfer device 110 and circuitry 154 associated with an electricity storage device 156 of the electrical vehicle 150. Examples of suitable receptacles are those conforming to the NEMA (National Electrical Manufacturers Association) standards 5-15, 5-20 and 14-50. Although, other receptacles will be used for systems outside the United States which operate at voltages other than 120V (for example 240V) and which are required to meet different standards. In preferred embodiments the electrical receptacle 112 has a cover. The cover is lockable and is released by the charge transfer device 110 upon receipt of a request for charging of an electrical vehicle 150 by the electric vehicle operator 160. This request may be made by the mobile communication device 162.

The indicator lights 114 are used to show the operational status of the Charge transfer device 110—for example, the status may be: charging in progress, charging complete, vehicle-to-grid (V2G) in progress and error warning. The indicator lights 114 may be LEDs (light emitting diodes), may be capable of showing a number of different colors and may be capable of continuous or flashing modes of operation. Alternatively, the indicator lights 114 may be replaced by an alphanumeric display.

The local power grid 120 is the electrical supply grid owned and operated by local utility companies. Although, the local power grid 120 does extend to parts of the electrical supply network that are not owned by the utility company, such as electrical cables on private premises.

The data control unit 130 acts as a bridge between the LAN and the WAN, and enables communication between the charge transfer device 110 and the server 140. The server 140 is generally remote from the charge transfer device 110. Alternatively, the server 140 may be collocated with the charge transfer device 110 and the data control unit 130.

The system 100 is shown in FIG. 1A with only one charge transfer device 110; however, the system may include many charge transfer devices 110, all linked to the server 140 through one or more data control units 130. There will be one or more data control unit(s) 130 for each group of geographically proximate (within the range of the same local area network) charge transfer devices 110.

The electric vehicle 150 is any battery operated electric vehicle, including EVs and plug in hybrids. Electric vehicles 150 that have the necessary V2G electronics are able to provide power to the local power grid 120.

Examples of compatible communication devices 162 are: one way and two-way RFID devices, an example of the latter being a FasTrak® card; Wi-Fi® devices, such as a personal computer; BlueTooth® devices, such as a mobile phone; and ZigBee® devices. In some embodiments of the invention the vehicle user 160 can monitor charging using the mobile communication device 162. This can be implemented by allowing access to the vehicle user 160 of the power consumed by the electric vehicle 150, which is monitored by the charge transfer device 110 and stored on the server 140. Access can either be directly to the charge transfer device 110 over a LAN or to the server 140 over the Internet.

In an embodiment, data control unit 130 is a payment station having a communication link to the server 140 over a WAN 185. The electric vehicle operator 160 may use the mobile communication device 162 to establish a communication link to the charge transfer device 110 over a wireless network 190. Instead of using a mobile communication device 162, the electric vehicle operator 160 may manually interact with the payment station, which then sends appropriate instructions to the charge transfer device 110 regarding charging of the electric vehicle 150. In preferred embodiments these instructions will include an instruction to unlock a cover over the electrical receptacle 112, thus allowing the vehicle operator 160 to connect the electric vehicle 150 to the electrical receptacle 112 with the electrical connector 152.

Figure 1B:
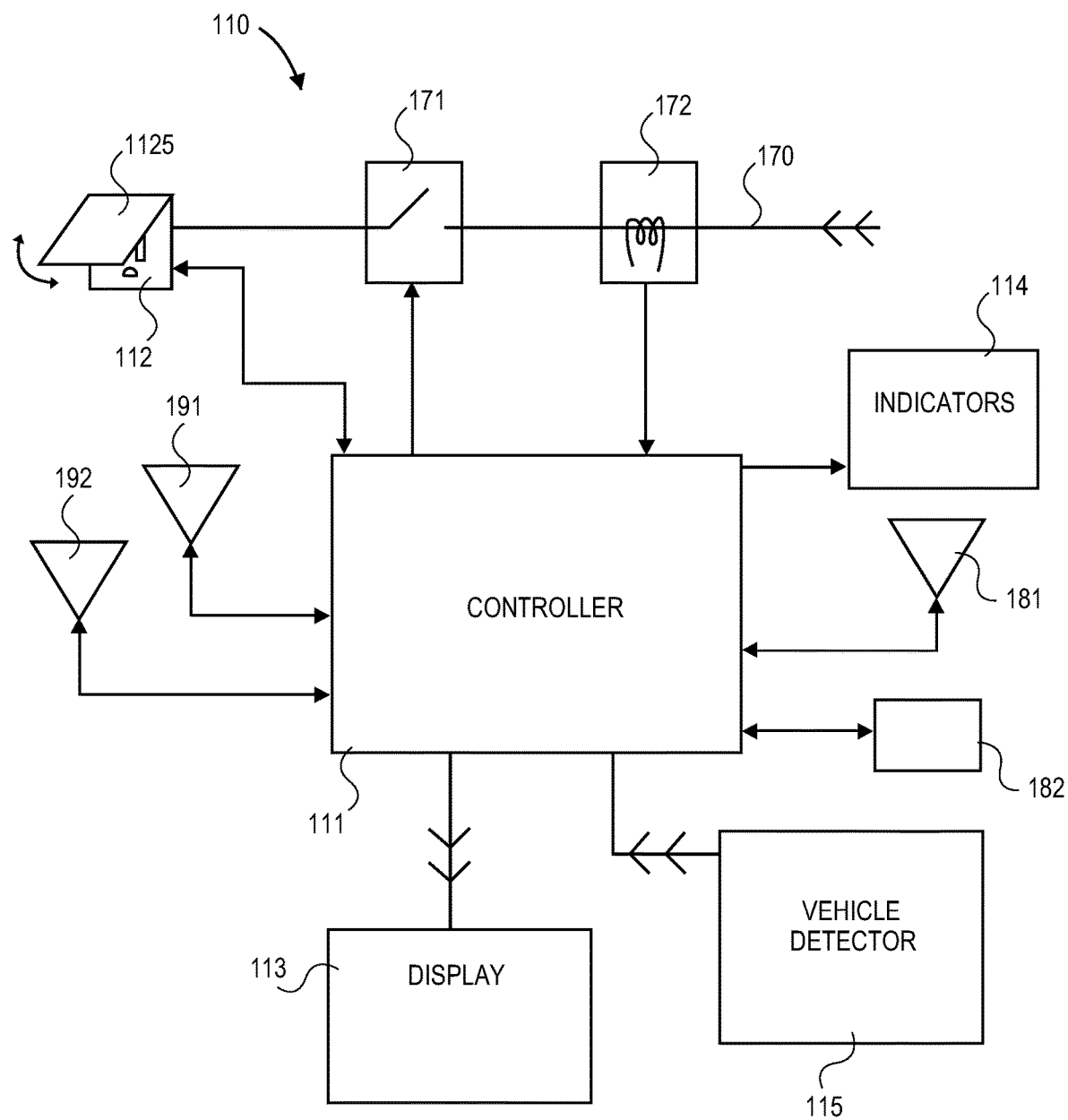
FIG. 1B is a schematic diagram of a network-connected charge transfer device according to one embodiment of the invention.

FIG. 1B is a schematic diagram of a network-connected charge transfer device according to one embodiment of the invention. The charge transfer device 110 comprises an electrical receptacle 112, a lockable cover 1125 over the electrical receptacle 112, a control device 171, a current measuring device 172, an electric power line 170, a controller 111, a display unit 113, a vehicle detector 115, a WLAN transceiver 181, an alternating current line transceiver 182, a WPAN transceiver 191 and an RFID transceiver 192.

Electric power is delivered to receptacle 112 along power line 170. Controller 111 is used to lock and unlock the cover 1125; the lock mechanism is electro-mechanical. When unlocked, the cover 1125 may be lifted by the vehicle operator 160 in order to connect the electric vehicle 150 to the electrical receptacle 112 using the electrical connector 152. Control device 171 is used to turn the electric supply at the receptacle 112 on and off. The control device 171 is preferably a solid state device and is controlled by controller 111. The current flowing along the power line 170 is measured by current measuring device 172. An example of a suitable measuring device 172 is an induction coil. The controller 111 is programmed to monitor the signal from the current measuring device 172 and to calculate the total energy either: consumed (in recharging the electric vehicle); or transferred to the local power grid 120 from the electric vehicle 150 (V2G). Alternatively, a power measuring device may be used for calculating the total energy consumed or transferred to the local power grid 120 from the electric vehicle 150. It is also envisaged that energy may be both consumed and transferred to the grid during the time an electric vehicle is connected to the charge transfer device 110, in which case the controller 111 will calculate both the energy consumed and the energy transferred to the local power grid 120.

The indicators 114 and display 113 are controlled by the controller 111 and are used to provide information to the charge transfer device 110 user. Vehicle detector 115 is used to detect the presence of a vehicle in the parking space corresponding to the charge transfer device 110. The vehicle detector 115 is controlled by the controller 111. The vehicle detector 115 is a detector such as a sonar sensor array, a camera, or an induction coil. The sonar array is an array as used on the rear bumper of automobiles to detect close proximity to an object; this array can be attached to the charge transfer device 110 or will be mounted to a support structure in close proximity to the charge transfer device 110. The camera is a digital camera providing a video signal to the charge transfer device 110; the video signal is processed by an object recognition program to detect the presence of a vehicle or other obstruction. The induction coil is either embedded in the pavement of the parking space or is protected by a roadworthy casing attached to the surface of the pavement. The induction coil is connected to the charge transfer device 110 and detects the presence of large metal objects in close proximity to the coil (such as an engine block, electric motor or rear differential of a vehicle).

The controller 111 is shown with four transceivers—a WLAN transceiver 181, an alternating current line transceiver 182, a WPAN transceiver 191 and an RFID transceiver 192. A transceiver is a device that both sends and receives signals, allowing for two-way communication. The WLAN transceiver 181 allows for the controller to communicate with charge transfer devices 110 and with a data control unit 130 or payment station. WLAN transceiver 181 could be a Wi-Fi® transceiver. The alternating current line transceiver allows the controller to communicate on a PLC network with a data control unit 130 or payment station. The WPAN transceiver 191 allows the controller 111 to communicate with charge transfer devices 110. The WPAN transceiver 191 could be a BlueTooth® or ZigBee® transceiver. The RFID transceiver 192 allows the controller to communicate with a compatible RFID device carried by the vehicle operator 160. An example of an RFID device that could be carried by the vehicle operator 160 is a FasTrak® card. A FasTrak® device is an example of a two-way RFID communication device. Although, a one-way RFID communication device from vehicle operator 160 to controller 111 can be utilized. Not all embodiments of the charge transfer device 110 have all four types of transceiver; however, all charge transfer device 110 will have at least one wireless transceiver for communication with compatible mobile wireless communication devices 162 available to vehicle operators 160, and one transceiver for communication with the data control unit 130.

Figure 2:
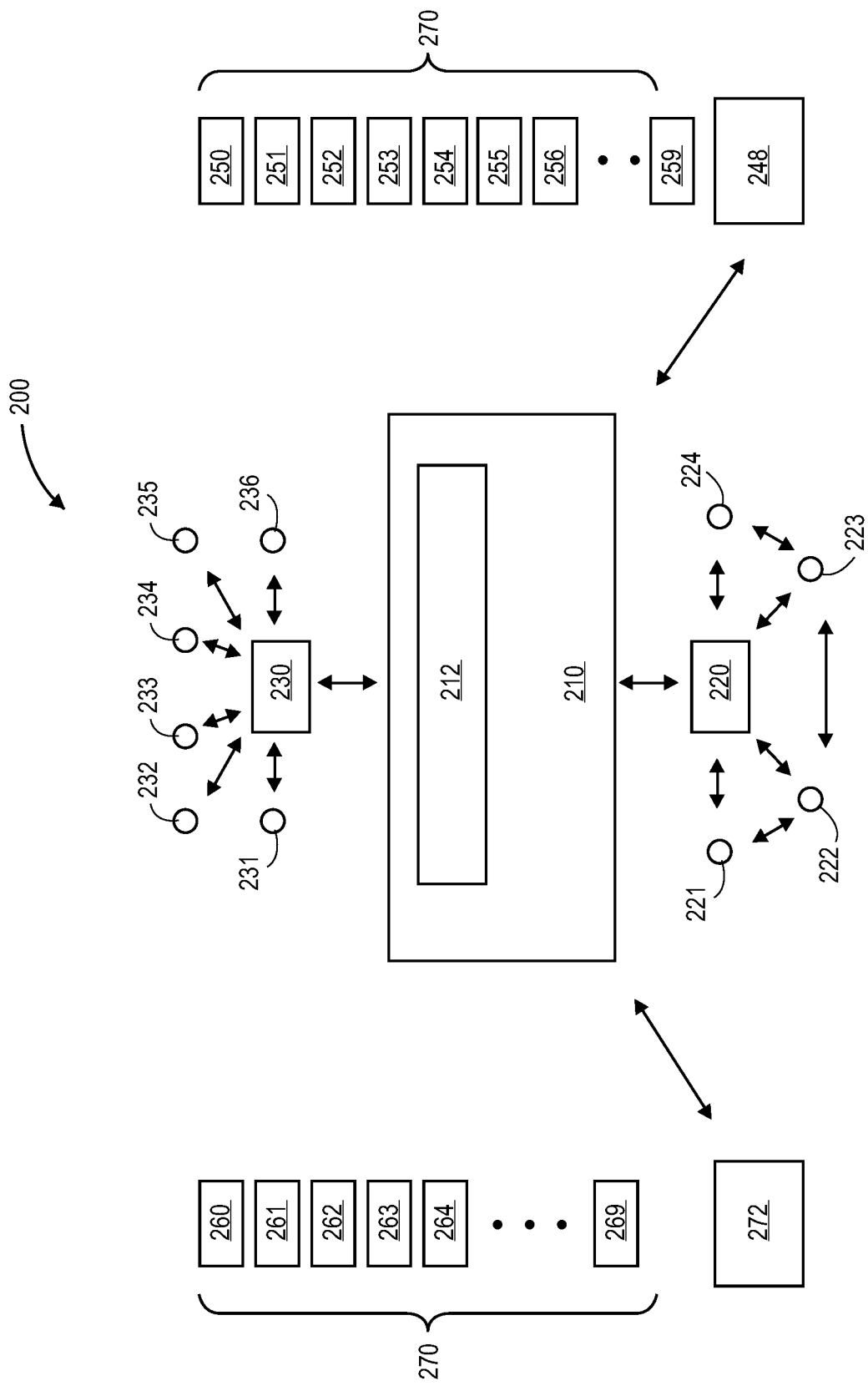
FIG. 2 is a block diagram of a fleet management system having a fleet management portal according to one embodiment of the invention.

FIG. 2 is a block diagram of a fleet management system having a fleet management portal for managing one or more fleets of electric cars according to one embodiment of the invention. The fleet management system 200 includes a server 210 having a fleet management portal 212. The fleet management portal 212 is used by fleet managers associated with data processing devices 272 and 248 to monitor and manage fleets 249 and 270 of electric vehicles. Each fleet 270 and 249 includes a plurality of electric vehicles (e.g., 260-269, 250-259). The data processing devices 272 and 248 connect to the portal 212 via a wide area network.

The server 210 and/or fleet management portal 212 monitors and manages gateways 220 and 230 (e.g., data control unit 130) that are associated with charge transfer devices (e.g., 231-236, 221-224). The gateways may also be charge transfer devices. A charge transfer device directly communicates with a gateway or indirectly via other charge transfer device(s). An electric vehicle may be associated with a charge transfer device in order to recharge the electricity storage device of the electric vehicle.

The fleet management portal 212 may include one or more software programs used to track subscriber and vehicle information associated with the fleets and also charging information associated with the charge transfer devices. This information is collected, stored, and analyzed to generate reports and manage the fleets.

Figure 3:
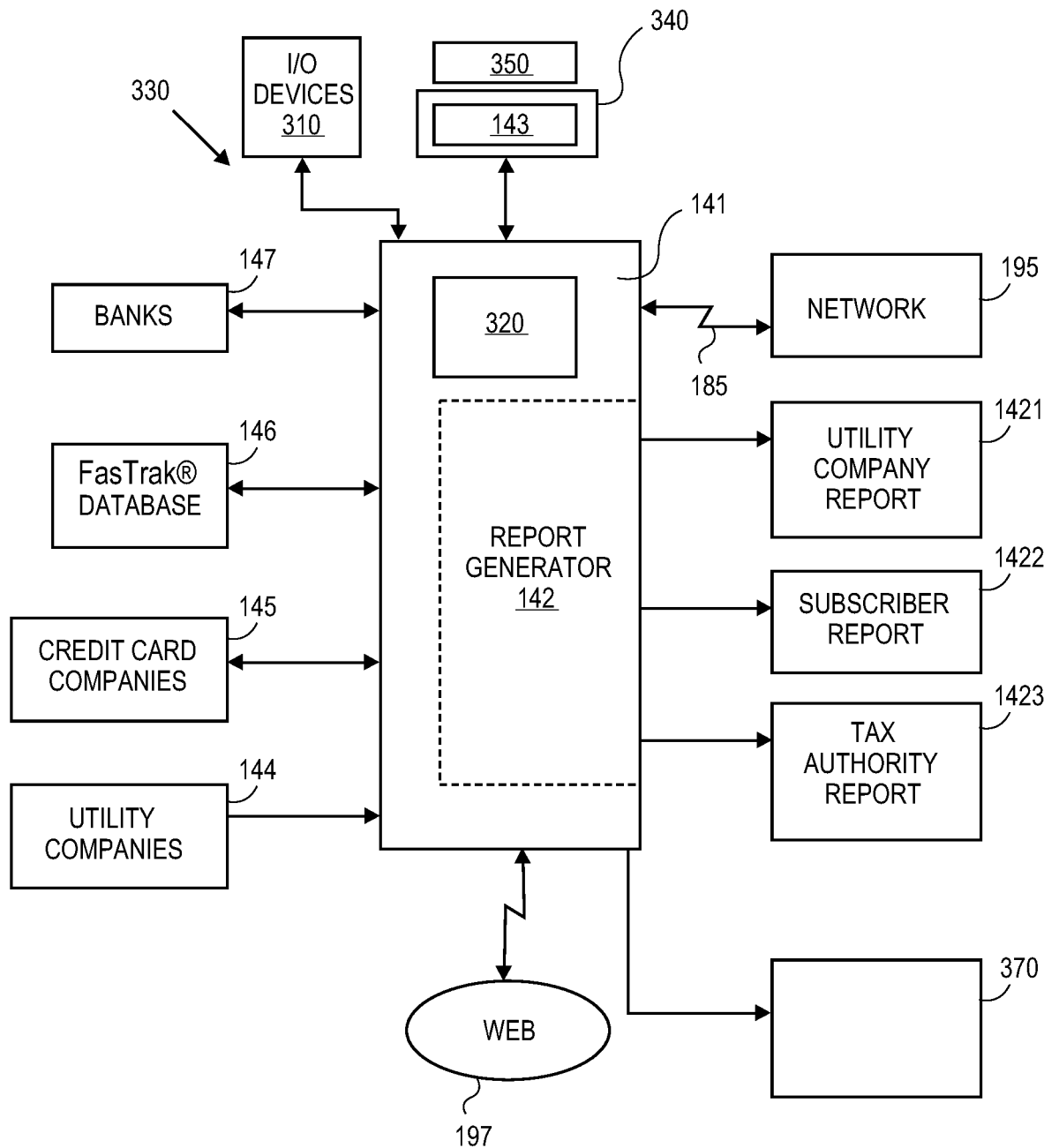
FIG. 3 is a schematic diagram of a server in accordance with one embodiment of the invention.

FIG. 3 is a schematic diagram of a server in accordance with one embodiment of the invention. The server 330 comprises a data processing system 141, a processing unit 320, a report generator 142, input/output (I/O) devices, and a memory 340, which includes a plurality of software programs 350 and a database 143. The server 330 has similar functionality in comparison to the servers 140 and 210 previously discussed. The server 330 is configured to communicate with the following: network 195; World Wide Web 197; utility companies 144, for receiving power load management data; credit card companies 145, for credit authorization and charging; FasTrak® database 146, for debiting FasTrak® accounts; and banks 147, for debiting bank accounts. The database 143 is used to store consumer profiles and other data required for report generation, as described below.

In some embodiments, the server 330 manages a plurality of electric vehicles (e.g., fleet). One or more programs 350 are stored in the memory 340 and configured to be executed by the processing unit 320. The programs 350 include instructions monitoring one or more fleets of electric vehicles using a fleet management portal associated with the server 300, monitoring a plurality of charge transfer devices using the fleet management portal, receiving charging information from the charge transfer devices, and determining a charging status for each electric vehicle based on the charging information. One of the programs may be a fleet management program used to generate various reports 370 including a report with charging information for each electric vehicle, which will be discussed in more detail in conjunction with FIGS. 5-23.

The report generator 142 also creates reports such as: utility company reports 1421, detailing energy consumed and vehicle to grid (V2G) energy sold to local power grid 120; subscriber reports 1422, detailing energy consumed and V2G energy sold to the local power grid 120, account balance, payments and invoices, and subscriber profile data; and tax authority reports 1423, providing details of taxable transactions.

The network 195 comprises a multiplicity of data control units 130 and/or payment stations, each data control unit 130 and/or payment station being connected by a communication link 180 to a multiplicity of charge transfer devices 110. The communication link 185 between the computer 141 and the network 195 is a WAN.

The server 330 is interfaced with the Web 197 to allow subscribers (owners and operators 160 of electric vehicles 150) to do the following: (1) set-up user/consumer profiles; and (2) determine availability of charge transfer devices for recharging their electric vehicles 150. A user profile contains financial account information—details required for payment—and may also include information such as whether the vehicle operator wants to: charge the electric vehicle only during periods of lower power rates; not charge the vehicle during periods of high power grid load; and sell power to the local grid. The availability of charge transfer devices 110 is stored on the server and the information is collected from the network 195. There are two ways that the availability of a charge transfer device 110 can be determined: (1) using a vehicle detector 115 (see FIG. 3 and related description) to determine whether the parking space corresponding to the charge transfer device 110 is available; and (2) flagging a charge transfer device 110 as being unavailable whenever charging is ongoing, V2G is ongoing or parking has been paid for.

Figure 4:
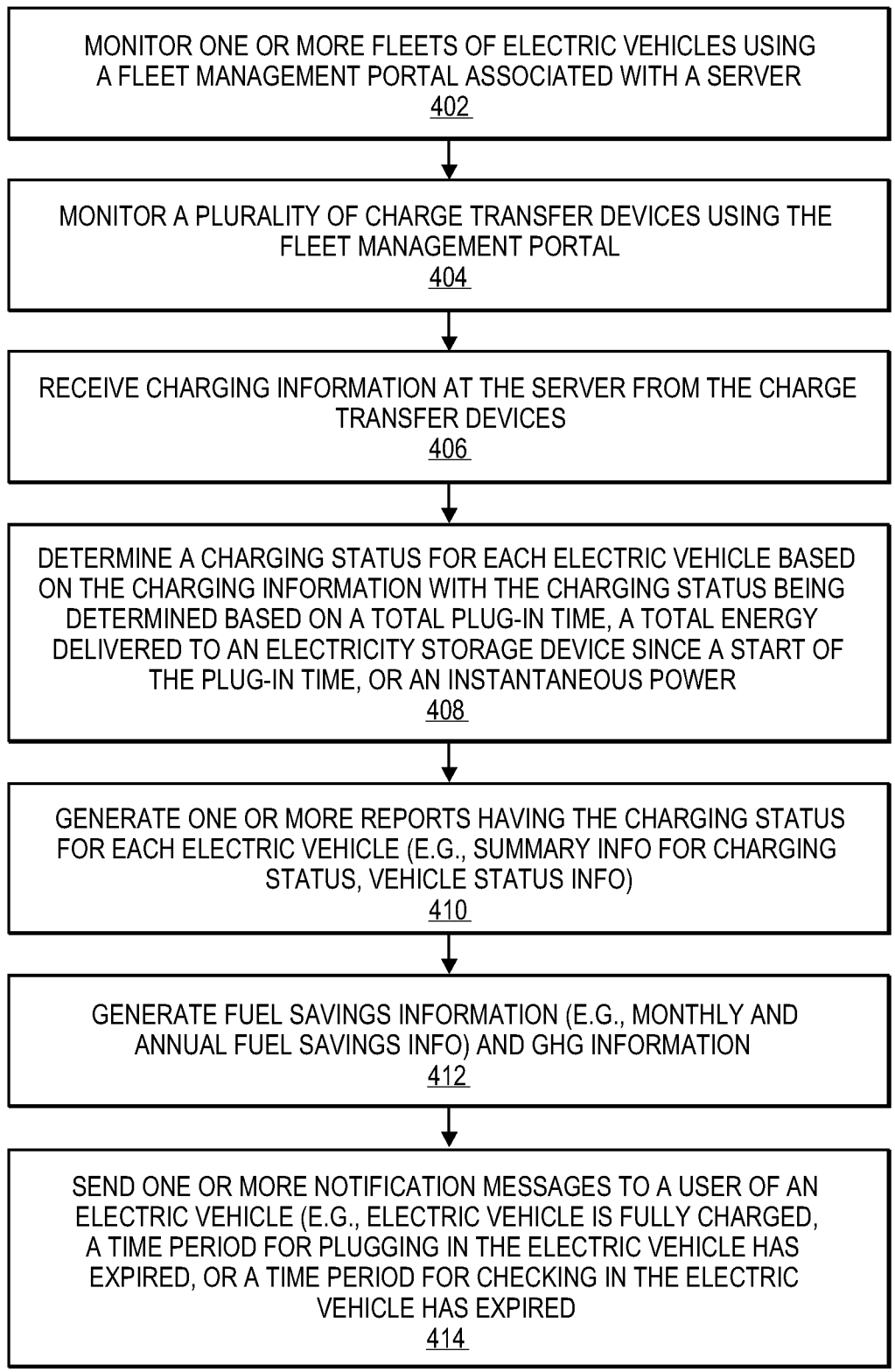
FIG. 4 is a flow diagram exemplary illustrating managing a plurality of electric vehicles in accordance with one embodiment of the invention.

FIG. 4 is a flow diagram exemplary illustrating managing a plurality of electric vehicles in accordance with one embodiment of the invention. A machine implemented method for managing the plurality of electric vehicles includes monitoring one or more fleets of electric vehicles using a fleet management portal associated with a server at block 402. A fleet manager can access the fleet management portal via an internet connection and monitor the one or more fleets. Next, the method includes monitoring a plurality of charge transfer devices using the fleet management portal at block 404. The fleet manager can use the fleet management portal to monitor the charge transfer device as well. Next, the method includes receiving charging information at the server from the charge transfer devices at block 406.

The server may also receive other information (e.g., vehicle information, user information) from a charge transfer device that is used to form an association or mapping between an electric vehicle connected to a charge transfer device. In one embodiment, an association between an electric vehicle and a charge transfer device is formed when an electricity storage device of the electric vehicle is plugged into the charge transfer device. A user 160 of the electric vehicle uses a wireless communication device 162 to receive access to a charge transfer device 110. The device 162 identifies the user 160 who is associated with a particular electric vehicle. In one embodiment, a one to one mapping is forced between the communication device 162 and the electric vehicle in order to know which electric vehicle is being charged by the charge transfer device 110.

Next, the method includes determining a charging status for each electric vehicle based on the charging information at block 408. The charging status may include a charging state, a fully charged state, or an unknown state. An electric vehicle having no current association or current mapping with a charge transfer device may have an unknown state. For example, this electric vehicle may be associated with the vehicle operator 160 currently using or driving the electric vehicle with no charging session being currently established. In another embodiment, an electric vehicle does not have an unknown state even when in use because the electric vehicle has a transmitter for transmitting the current charging state (e.g., fully charged, partially charged, nearly discharged, etc.) directly or indirectly to the server. Next, the method includes generating one or more reports having the charging status for each electric vehicle at block 410. The status information in the one or more reports is discussed in more detail in conjunction with FIG. 6.

The charging status can be determined in various ways. For example, the charging status is determined by (1) determining a total plug-in time for a vehicle electricity storage device, (2) determining a total energy delivered to a vehicle electricity storage device since a start of the plug-in time, and/or (3) determining an instantaneous power being currently delivered to a vehicle electricity storage device. For the first two cases, a "worst case" recharging time and a "total number" of kWh that each electricity storage device requires is known and stored on the server. If a measured time or total number of kWh for a charging session exceeds those values, then it is known that the electricity storage device is fully charged. In the third case, a trickle charge for each storage device is known and if the power approaches the trickle charge, then it is known that the storage device is fully charged. For example, an electric vehicle may have a trickle drawn power of 25 W indicating a fully charged state and a recharging drawn power of 1000 W when the storage device is actually charging. These ways can be used separately or in combination to determine the charging status for each electric vehicle.

In an alternative embodiment, an electricity storage device is associated with a transceiver that can be queried for a state of charge and then transmit this state of charge to the charge transfer device if currently charging and then the charge transfer device can transmit this information to the server. Alternatively, if the electric vehicle is in use, the state of charge can be transmitted directly to the server or to another communication entity or server, which transmits this information to the server (e.g., 140, 210, 330).

Next, the method includes generating fuel savings information and GHG information at block 412. The fuel saving information and GHG information is discussed in more detail in conjunction with FIG. 5. Next, the method further includes sending one or more notification messages to a subscriber or user of an electric vehicle at block 414. A notification message may be in the form of an email or a SMS message or other types of electronic messaging. For example, a notification message may be sent to the user if the electric vehicle is fully charged or almost charged, or not charging, or periodic updates providing the amount of energy transferred thus far. Alternatively, a notification message may be sent if a time period for plugging in the electric vehicle has expired, which may occur if a user forgets to plug in his electric vehicle. Alternatively, a notification message may be sent if a time period for checking in the electric vehicle has expired, which may occur if a user forgets to return or check in his electric vehicle. For example, a user or subscriber may check out a vehicle for 5 hours, but the subscriber has not returned the vehicle 5 hours after starting a session. In this case, a notification message is sent to the subscriber. In an embodiment, a notification message is sent to a user or subscriber at the same time each day (e.g., 6 pm) if the vehicle is not charging at this time.

In one embodiment, a subscriber establishes a session with a charge transfer device by waving their communication device 162 near the charge transfer device, opening a door to the charge transfer device, plugging in the cord to the charge transfer device, and then shutting and locking the door to the charge transfer device. However, if the subscriber forgets to plug the other end of the cord into the electricity storage device 156 or circuitry 154 associated with the electricity storage device 156 (or has a bad connection), then, a timer may be set to expire within a certain time period if no current is seen being transferred to the electric vehicle. A power receptacle associated with the charge transfer device can be de-energized and a notification message sent to the subscriber.

In one embodiment, the server is programmed to transmit notification messages to those subscribers (or to other person (s) as designated by the subscribers and/or the fleet manager) that will have their charging sessions suspended due to the amount of load on the power grid. These messages are referred to as Demand Response notification messages. In some situations, only those subscribers which have registered for grid-friendly charging will have their charging sessions suspended while in other situations subscribers, regardless of service plan, will have their charging sessions suspended.

In one embodiment, the server is programmed to transmit notification messages responsive to an alarm generated by a charging station or triggered by the server. These notification messages may be sent to the appropriate operators, administrators, and/or owners of the charging stations experiencing an alarm event and/or to the subscribers using a charging station that is experiencing an alarm event. Example alarm events include the following: a charge transfer device has failed to respond to a periodic heartbeat from the server, a charge transfer device has unexpectedly rebooted, a charge transfer device has detected a problem (hardware and/or software), a GFCI in the charge transfer device has tripped.

In one embodiment of the invention, the server determines that a subscriber has established a charging session with a charge transfer device but has failed to plug their charging cord into their vehicle by examining the charging data received from that charge transfer device. For example, if the charging data indicates that the charging session has been established for a threshold amount of seconds and the electricity transferred is below a certain threshold, the server may notify the subscriber that charging has not occurred. In addition, the server may transmit a command to the charge transfer device instructing it to suspend the session and prevent electricity from flowing through the power receptacle.

FIGS. 5-23 illustrate exemplary user interfaces of a software program for managing electric vehicles in accordance with one embodiment of the invention. The software program may be a fleet management portal program located on the server. The fleet management portal program may be used by a fleet manager to monitor and manage one or more fleets of electric vehicles.

Figure 5:
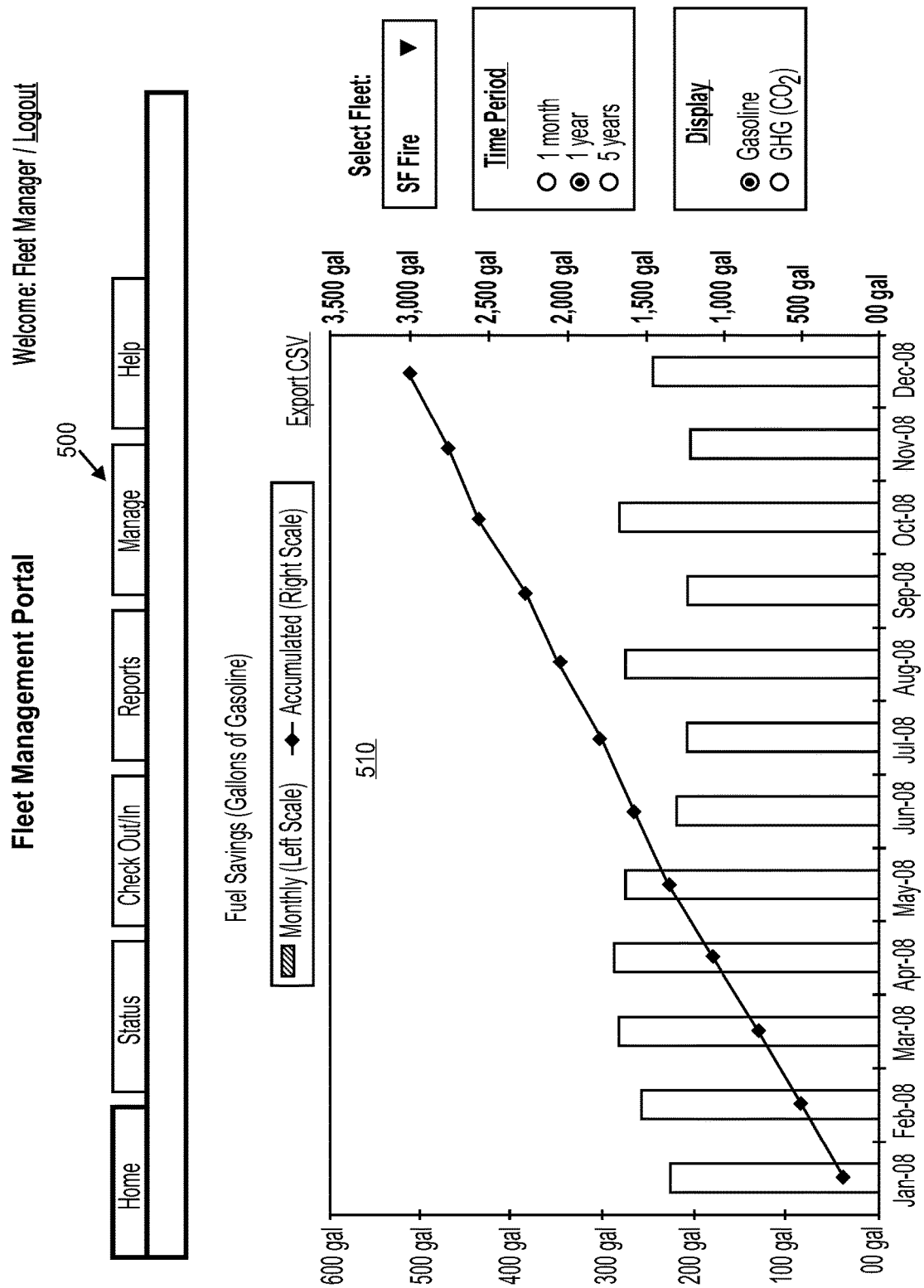
FIG. 5 illustrates an exemplary fuel savings user interface of a software program for managing electric vehicles in accordance with one embodiment of the invention.

FIG. 5 illustrates an exemplary fuel savings user interface of a software program for managing electric vehicles in accordance with one embodiment of the invention. The fuel savings information 500 as discussed in block 406 includes a monthly fuel savings of gasoline that is saved by the user or grouping of users (e.g., SF Fire) of the plurality of electric vehicles, which is illustrated in the chart 510. The monthly fuel savings, in one example, varies from 200 to 300 gallons. The fuel savings information 500 includes an annual fuel savings of gasoline that is saved by the user of the plurality of electric vehicles, which is also illustrated in the chart 510. The annual fuel savings for the SF Fire fleet, in one example, is approximately 3,000 gallons of gasoline. An additional chart and calculation is performed to convert this into a monetary savings based on the cost of gasoline.

For example, if a typical gasoline car has an efficiency of 23.9 miles/gallons and gasoline costs $2/gal, then the gasoline operating cost is 8.4 cents/mile (2/23.9). If electricity costs 11 cents/kWh with an electric car having an efficiency of 5.0 mi/kWh, then the electricity operating cost is 2.3 cents/mile (0.11/5.0). Thus, the resulting cost savings with these estimates is 6.1 cents/mile. Using EPA gas efficiency estimates, a net fuel cost savings is $0.30/kWh and a net gasoline savings is 0.209 gallon/kWh.

The fuel savings information 500 may also include a monthly reduction in an emission of green house gas resulting from the use of the plurality of electric vehicles and an annual reduction in emission of green house gas resulting from the use of the plurality of electric vehicles. For example, if you drive 23 miles in a gasoline vehicle, then the vehicle emits x pounds of $CO_2$. If you drive the same 23 miles in an electric vehicle, then the vehicle emits y pounds of $CO_2$ with x being significantly larger than y. Using EPA gas $CO_2$ emission and household $CO_2$ emission estimates, gasoline as fuel emits 19.4 lbs of $CO_2$ emitted/gallon, which, using EPA gas efficiency estimates and electric vehicle efficiency estimates, emits an equivalent of 4.06 lbs of $CO_2$/kWh and 1.841 kg/kWh. The $CO_2$ emitted as a result of generating electricity to power an electric vehicle is 0.621 kg/kWh and 1.37 lbs/kWh, based on EPA estimates of 14796 lbs/house/year and 900 kWh/month/house. Thus, a net GHG savings with $CO_2$ being 95% of GHG is 1.284 kg/kWh and 2.83 lbs/kWh for using an electric vehicle rather than a gasoline vehicle.

Figure 6:
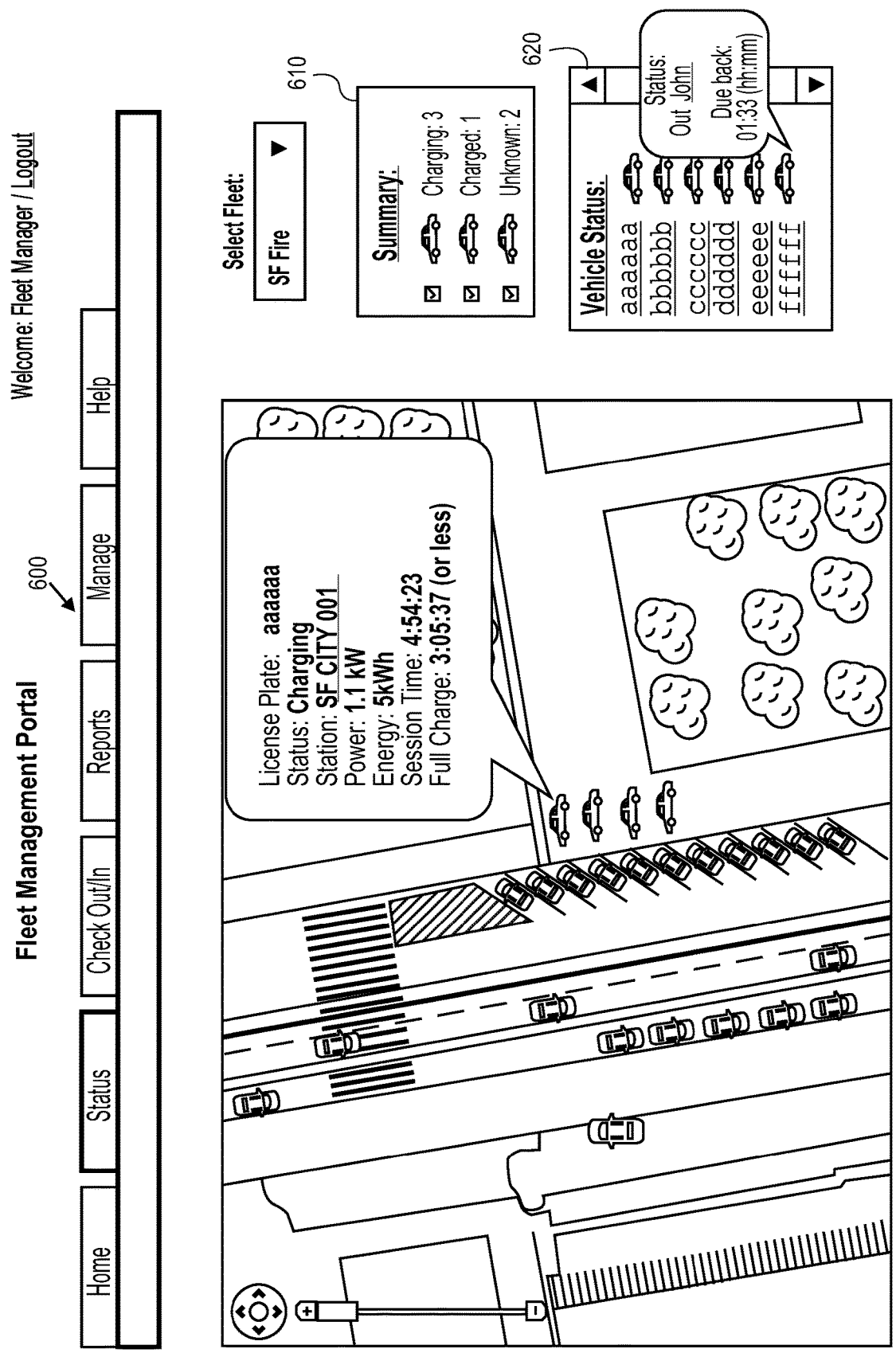
FIG. 6 illustrates an exemplary electric vehicle status user interface of a software program for managing electric vehicles in accordance with one embodiment of the invention.

FIG. 6 illustrates an exemplary electric vehicle status user interface of a software program for managing electric vehicles in accordance with one embodiment of the invention. The status information 600 as discussed in block 408 includes summary information 610 having the charging status of the plurality of electric vehicles. The status information also includes vehicle status information 620 for each electric vehicle that includes a license plate identifier, a charging status, a charging station, a power delivered to each battery in unit of kW, an energy delivered to each battery in units of kWh, a charging session time, and a time period until a battery is fully charged. The vehicle status information 620 may also include a status of an associated user. For example, John is out driving vehicle fffff and is due back at 01:33.

FIG. 7 illustrates an exemplary electric vehicle check out user interface of a software program for managing electric vehicles in accordance with one embodiment of the invention. A check out option 710 is selected for this user interface 700. This user interface 700 includes driver, vehicle, duration, and notification options as well as driver list and vehicle list filters. The notification options include vehicle not returned, vehicle not plugged in, and vehicle fully charged. These notification messages can be sent to a driver, a fleet manager, or both.

FIG. 8 illustrates an exemplary electric vehicle check in user interface of a software program for managing electric vehicles in accordance with one embodiment of the invention. A check in (return) option 892 is selected to generate this user interface 890. This user interface 890 includes a driver/vehicle pick list filter with department, fleet, and vehicle type filters. A driver/vehicle combination is submitted for check in.

Figure 9:
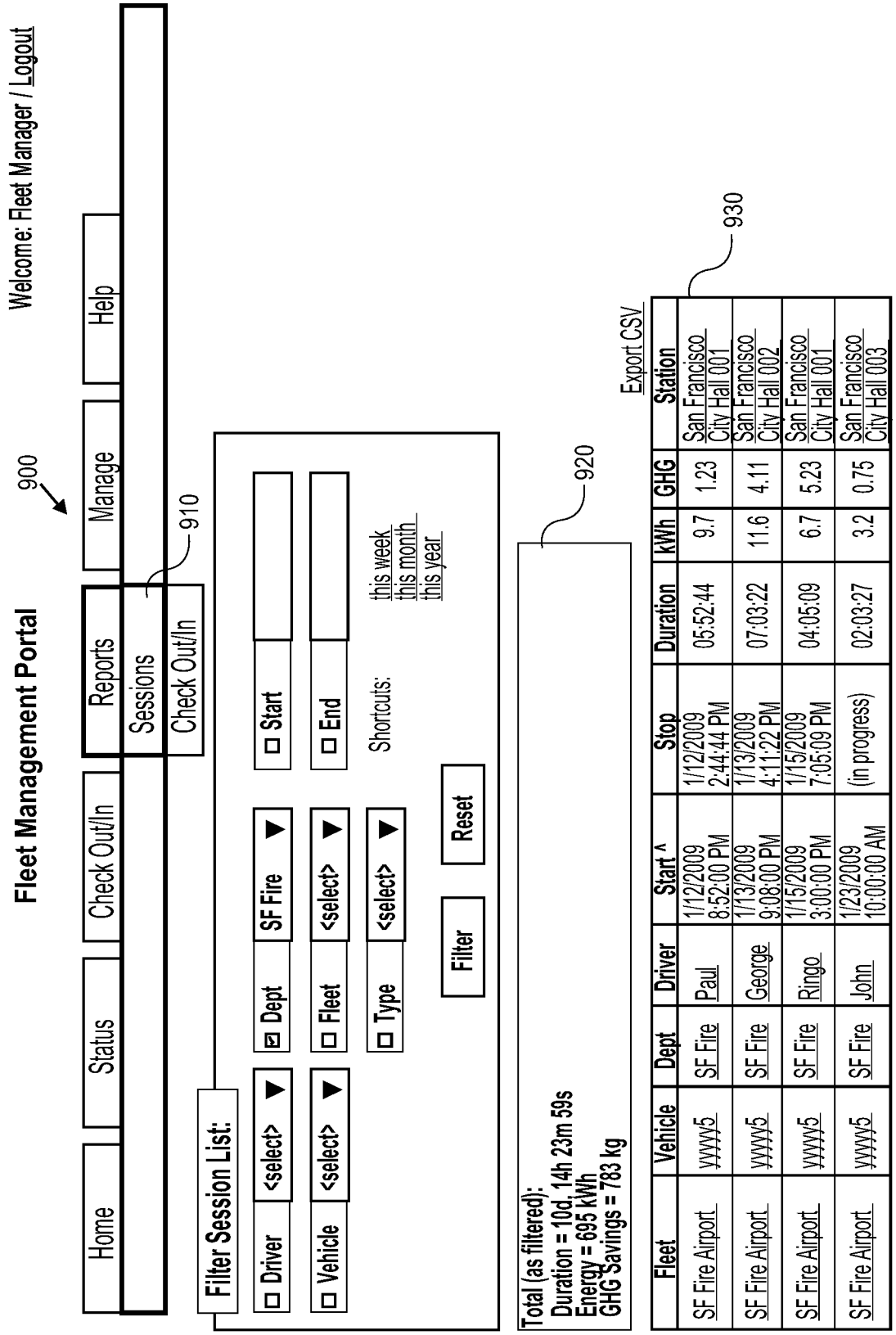
FIG. 9 illustrates an exemplary session report user interface of a software program for managing electric vehicles in accordance with one embodiment of the invention.

FIG. 9 illustrates an exemplary session report user interface of a software program for managing electric vehicles in accordance with one embodiment of the invention. A sessions option 910 is selected to generate this user interface 900. This user interface 900 includes a filter session list having driver, vehicle, station, department, fleet, and type filters along with start and end time period options. A total (as filtered) section 920 displays a time period (e.g., duration), an energy consumed (e.g., 695 kWh), and a GHG savings (e.g., 783 kg). A report 930 based on the filter is generated that includes driving session data. For example, the report 930 includes columns for fleet, vehicle, dept, driver, driving start time, driving end time, driving duration, electricity consumed, GHG emitted, and station.

FIG. 10 illustrates an exemplary check out/in report user interface of a software program for managing electric vehicles in accordance with one embodiment of the invention. A check out/in option 1010 is selected to generate this user interface 1000. This user interface 1000 includes a filter check-out/check-in list having driver, vehicle, department, fleet, and type filters along with start and end time period options. A total (as filtered) section 1020 displays a time period (e.g., duration). A report 1030 based on the filter is generated that includes check-out and check-in data. For example, the report 1030 includes columns for fleet, vehicle, dept, driver, check-out time and date, check-in time and date, and a difference between the check-in and check-out times.

Figure 12:
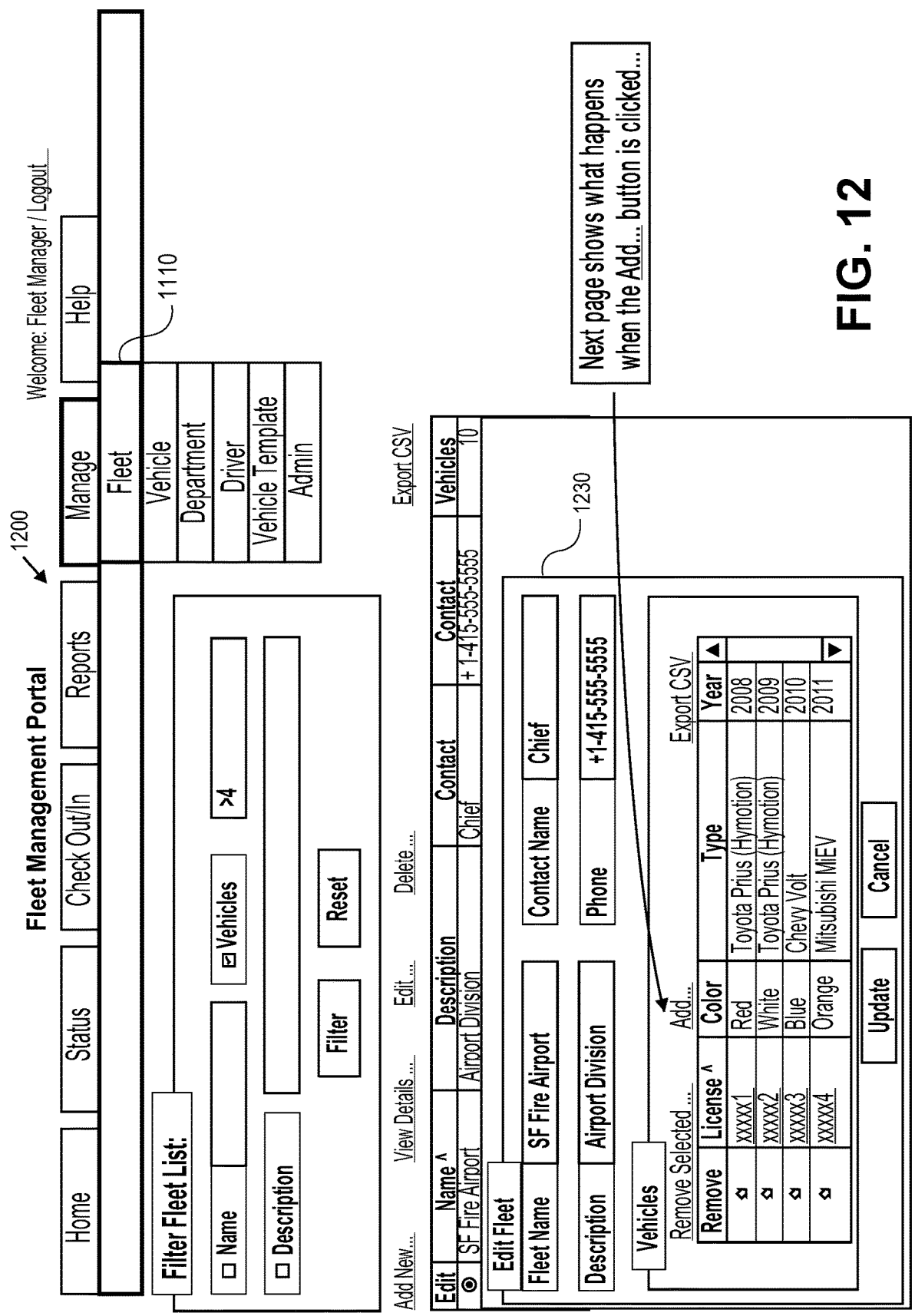

FIGS. 11-13 illustrate exemplary fleet manage user interfaces of a software program for managing electric vehicles in accordance with one embodiment of the invention. A fleet manage option 1110 is selected to generate this user interface 1100. This user interface 1100 includes a filter fleet list having name of a fleet, description of the fleet, and vehicle filters. A report 1130 based on the filter(s), which in this case is fleets having more than 4 vehicles, is generated that includes fleet data. For example, the report 1030 includes columns for editing, name, description, contact name and number, and number of vehicles.

If a top row associated with the SF Fire Airport fleet is selected for editing, then a user interface 1200 is generated as illustrated in FIG. 12. This user interface 1200 includes an edit fleet section 1230 having editable information for the SF Fire Airport fleet. If 'Add' link is selected by a user, then user interface 1300 is generated as illustrated in FIG. 13. Add vehicle section 1330 allows the addition of vehicles this fleet. Vehicles can also be removed with the 'Remove Selected' link.

Figure 14:
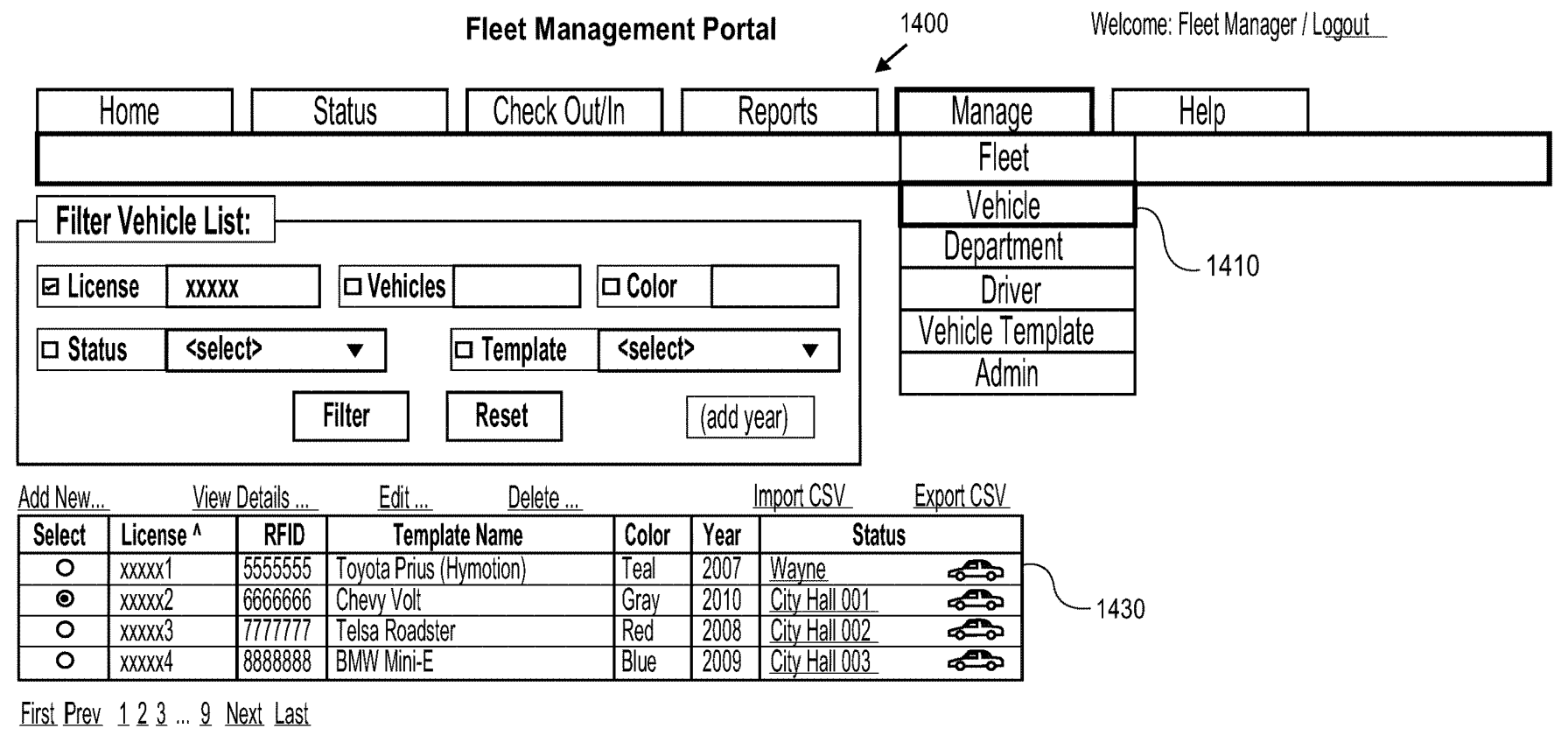

FIGS. 14 and 15 illustrate exemplary vehicle manage user interfaces of a software program for managing electric vehicles in accordance with one embodiment of the invention. A vehicle manage option 1410 is selected to generate this user interface 1400. This user interface 1400 includes a filter vehicle list having information associated with a vehicle such as license plate identifier, RFID, color, status, and template filters. A report 1430 based on the filter(s), which in this case is license plate identifier, is generated that includes vehicle data. For example, the report 1430 includes columns such as select, license plate identifier, RFID, template name, color, year, and status.

If a second row associated with the license plate xxxxx2 is selected, then a user interface 1500 is generated as illustrated in FIG. 15. This user interface 1500 includes an edit vehicle section 1230 having editable information for the vehicle with license plate xxxxx2.

FIGS. 16 and 17 illustrate exemplary department manage user interfaces of a software program for managing electric vehicles in accordance with one embodiment of the invention. A department manage option 1610 is selected to generate this user interface 1600. This user interface 1600 includes a filter department list having information associated with a department name filter, a description filter, and a number of drivers filter. A report 1630 based on the filter(s), which in this case is SF Fire departments having more than or equal to 5 electric vehicles, is generated that includes department data. For example, the report 1630 includes columns such as select, department name, description, contact person, phone number, and number of drivers.

If a second row associated with the SF police is selected, then a user interface 1700 is generated as illustrated in FIG. 17. This user interface 1700 includes an edit department section 1730 having editable information for the selected department. For example, a list of drivers in the SF police department is displayed. Drivers can be added or deleted.

FIGS. 18 and 19 illustrate exemplary driver manage user interfaces of a software program for managing electric vehicles in accordance with one embodiment of the invention. A driver manage option 1810 is selected to generate this user interface 1800. This user interface 1800 includes a filter driver list having information associated with a driver name, department name, driver ID, driver phone number, and status. A report 1830 based on the filter(s), which in this case is the SF Fire department, is generated that includes driver data. For example, the report 1830 includes columns such as select, department name, driver name, phone number, status, and email address.

If a second row associated with a driver (e.g., Jari) of the SF police is selected, then a user interface 1900 is generated as illustrated in FIG. 19. This user interface 1900 includes an edit driver section 1930 having editable information for the selected driver.

FIGS. 20 and 21 illustrate exemplary vehicle template manage user interfaces of a software program for managing electric vehicles in accordance with one embodiment of the invention. A vehicle template manage option 2010 is selected to generate this user interface 2000. This user interface 2000 includes a filter vehicle template list having information associated with a template name, vehicle make, vehicle model, battery, and efficiency. A report 2030 based on the filter(s), which in this case is batteries having a capacity greater than or equal to 5 kWh, is generated that includes vehicle template data. For example, the report 2030 includes columns such as select, template name, vehicle make, vehicle model, battery, and efficiency.

If a second row associated with a template name (e.g., Chevy Volt) is selected, then a user interface 2100 is generated as illustrated in FIG. 21. This user interface 2100 includes an edit vehicle template section 2130 having editable information for the selected vehicle template.

Figure 22:
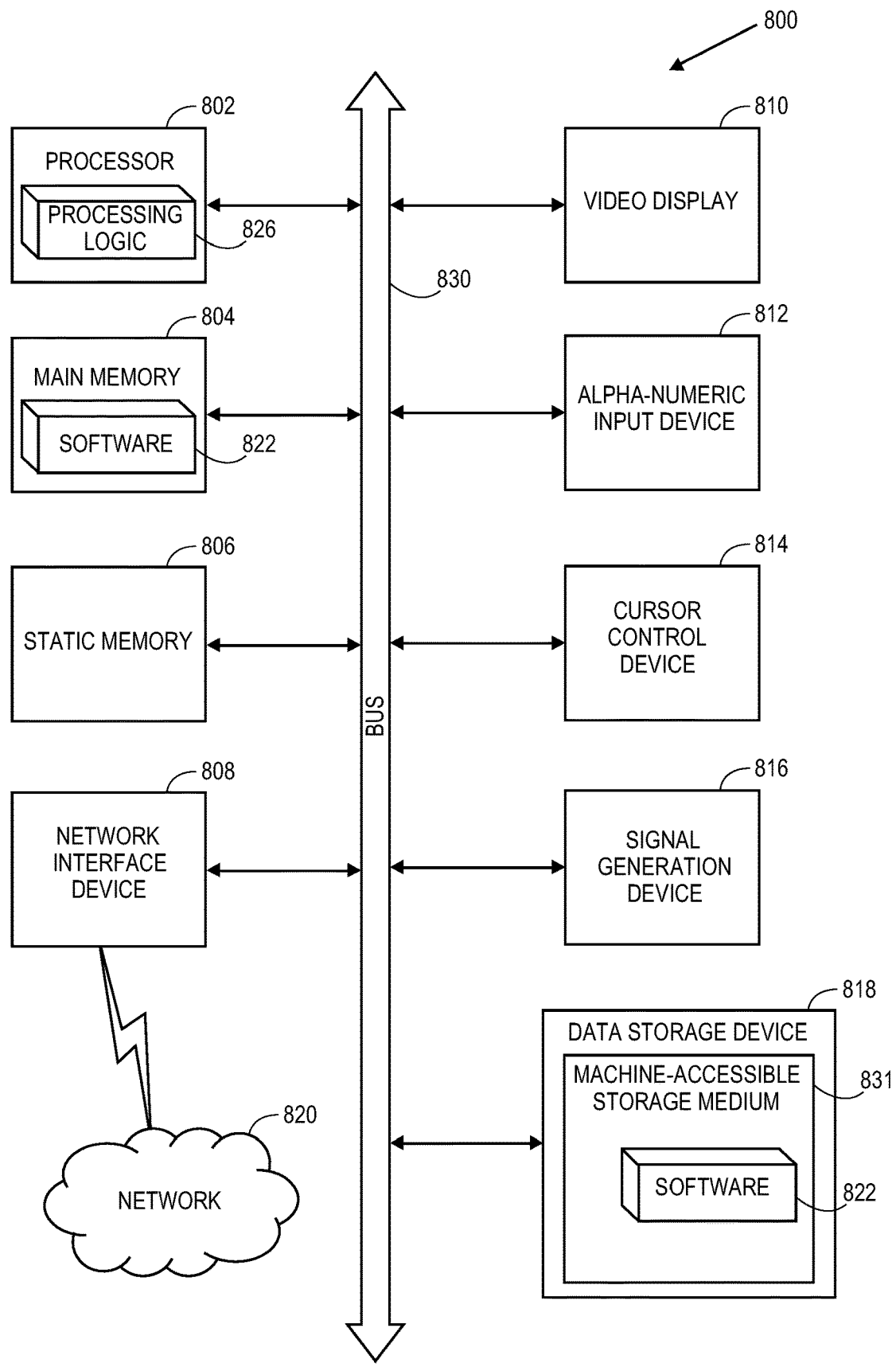
FIG. 22 illustrates a diagrammatic representation of a machine in the exemplary form of a computer system within which a set of instructions, for causing the machine to perform any one or more of the methodologies discussed herein, may be executed.

FIG. 22 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 914 (e.g., a mouse), and a signal generation device 816 (e.g., a speaker).

The data storage device 818 may include a machine-accessible storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-accessible storage media. The software 822 may further be transmitted or received over a network 820 via the network interface device 808. The machine-accessible storage medium 831 may also be used to store data structure sets that define user identifying states and user preferences that define user profiles. Data structure sets and user profiles may also be stored in other sections of computer system 800, such as static memory 806.

While the machine-accessible storage medium 831 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical, and magnetic media.

The above embodiments of the present invention have been given as examples, illustrative of the principles of the present invention. Variations of the system and method will be apparent to those skilled in the art upon reading the present disclosure. These variations are to be included in the spirit of the present invention. For example, the network of charge transfer devices may be used for public and private garage and parking lot charging of electric vehicles. Furthermore, the network of charge transfer devices may be used for home charging of electric vehicles, in which case a receptacle in the home is connected via a LAN and a WAN to the server 140. Those skilled in the art will appreciate that the network may also be used for non-vehicle applications, including selling electricity to people in places such as airports and coffee shops.

What is claimed is:

1. A machine implemented method for managing one or more fleets of electric vehicles, comprising:
   monitoring one or more fleets of electric vehicles using a fleet management portal associated with a server;
   monitoring a plurality of charge transfer devices using the fleet management portal;
   receiving charging information from the charge transfer devices;
   determining a charging status for each electric vehicle based on the charging information;
   generating a report having the charging status for each electric vehicle;
   generating fuel savings information; and
   generating greenhouse gas reduction information.

2. The method as in claim 1, wherein the charging status further comprises a charging state, a fully charged state, or an unknown state.

3. The method as in claim 1, wherein determining the charging status further comprises determining a total plug-in time.

4. The method as in claim 1, wherein determining the charging status further comprises determining a total energy delivered to a vehicle electricity storage device since a start of the plug-in time.

5. The method as in claim 1, wherein determining the charging status further comprises determining an instantaneous power being currently delivered to a vehicle electricity storage device.

6. The method as in claim 1, wherein the report further comprises:
generating status information that includes at least one of the following:
summary information for the charging status of each electric vehicle of the one or more fleets of electric vehicles; and
vehicle status information for each electric vehicle of the one or more fleets of electric vehicles that includes at least one of a license plate identifier, a charging status, a charging station, a power delivered to each electricity storage device, energy delivered to each electricity storage device, a charging session time, and a time period until a electricity storage device is fully charged.

7. The method as in claim 1, further comprising:
sending a notification message to a user of an electric vehicle of the plurality of electric vehicles for at least one of the following conditions:
the electric vehicle is fully charged;
a time period for plugging in the electric vehicle has expired; and
a time period for checking in the electric vehicle has expired.

8. A non-transitory machine-accessible medium storing executable program instructions which when executed cause a machine to perform a method comprising:
monitoring one or more fleets of electric vehicles using a fleet management portal associated with a server;
monitoring a plurality of charge transfer devices using the fleet management portal;
receiving charging information from the charge transfer devices;
determining a charging status for each electric vehicle based on the charging information;
generating a report having the charging status for each electric vehicle;
generating fuel savings information; and
generating greenhouse gas reduction information.

9. The non-transitory machine-accessible medium as in claim 8, wherein the charging status further comprises a charging state, a fully charged state, or an unknown state.

10. The non-transitory machine-accessible medium as in claim 8, wherein determining the charging status further comprises determining a total plug-in time.

11. The non-transitory machine-accessible medium as in claim 8, wherein determining the charging status further comprises determining a total energy delivered to a vehicle electricity storage device since a start of the plug-in time.

12. The non-transitory machine-accessible medium as in claim 8, wherein determining the charging status further comprises determining an instantaneous power being currently delivered to a vehicle electricity storage device.

13. The non-transitory machine-accessible medium as in claim 8, the method further comprising:
generating status information that includes at least one of the following:
summary information for the charging status of each electric vehicle of the one or more fleets of electric vehicles; and
vehicle status information for each electric vehicle of the one or more fleets of electric vehicles that includes at least one of a license plate identifier, a charging status, a charging station, a power delivered to each electricity storage device, energy delivered to each electricity storage device, a charging session time, and a time period until a electricity storage device is fully charged.

14. The non-transitory machine-accessible medium as in claim 8, the method further comprising:
sending a notification message to a user of an electric vehicle of the plurality of electric vehicles for at least one of the following conditions:
the electric vehicle is fully charged;
a time period for plugging in the electric vehicle has expired; and
a time period for checking in the electric vehicle has expired.

15. A server for managing a plurality of electric vehicles, comprising:
a processing unit coupled to an input/output (I/O) device;
a memory coupled to the processing unit; and
one or more programs, wherein the one or more programs are stored in the memory and configured to be executed by the processing unit, the programs including:
instructions for monitoring one or more fleets of electric vehicles using a fleet management portal associated with the server;
monitoring a plurality of charge transfer devices using the fleet management portal;
receiving charging information from the charge transfer devices;
determining a charging status for each electric vehicle based on the charging information;
generating a report having the charging status for each electric vehicle;
generating fuel savings information; and
generating greenhouse gas reduction information.

16. The server as in claim 15, wherein determining the charging status further comprises instructions for at least one of determining a total plug-in time, determining a total energy delivered to a vehicle electricity storage device since a start of the plug-in time, and determining an instantaneous power being currently delivered to a vehicle electricity storage device.

17. The server as in claim 15, wherein the programs further comprise instructions for generating status information in the report that includes at least one of the following:
summary information for the charging status of each electric vehicle of the one or more fleets of electric vehicles; and
vehicle status information for each electric vehicle of the one or more fleets of electric vehicles that includes at least one of a license plate identifier, a charging status, a charging station, a power delivered to each electricity storage device, energy delivered to each electricity storage device, a charging session time, and a time period until a electricity storage device is fully charged.

18. The server as in claim 15, wherein the programs further comprise instructions for sending a notification message to a user of an electric vehicle of the plurality of electric vehicles for at least one of the following conditions:
the electric vehicle is fully charged;
a time period for plugging in the electric vehicle has expired; and
a time period for plugging in the electric vehicle has expired.

* * * * *